US 6,696,965 B2

(12) United States Patent
Stout et al.

(10) Patent No.: US 6,696,965 B2
(45) Date of Patent: Feb. 24, 2004

(54) ROTARY PADDLE BIN MONITOR

(75) Inventors: Jeffrey S. Stout, DeKalb, IL (US); Jeffrey S. Cole, Sandwich, IL (US)

(73) Assignee: Monitor Technologies, LLC, Elburn, IL (US)

( * ) Notice: Subject to any disclaimer, the term of this patent is extended or adjusted under 35 U.S.C. 154(b) by 290 days.

(21) Appl. No.: 09/879,366

(22) Filed: Jun. 12, 2001

(65) Prior Publication Data

US 2002/0186139 A1 Dec. 12, 2002

(51) Int. Cl.[7] .............................................. G08B 21/00
(52) U.S. Cl. ...................... 340/617; 340/615; 340/686.3
(58) Field of Search ................................ 340/603, 605, 340/606, 607, 612, 615, 616, 617, 679, 686.1, 686.3; 200/61.21; 53/374.2, 347.3, 570; 73/861.02, 861.03, 861.77, 312

(56) References Cited

U.S. PATENT DOCUMENTS

| | | | | |
|---|---|---|---|---|
| 3,818,159 A | * | 6/1974 | Evans et al. | 340/617 |
| 3,995,167 A | * | 11/1976 | Kulig | 250/577 |
| 4,392,032 A | * | 7/1983 | Roach, II | 340/617 |
| 4,875,295 A | * | 10/1989 | Fleckenstein | 73/312 |
| 5,095,338 A | * | 3/1992 | Hayes, Jr. et al. | 355/246 |
| 5,164,555 A | * | 11/1992 | Brenton | 200/61.21 |

OTHER PUBLICATIONS

Monitor Technologies website pages on *Point Level Monitors* dated Apr. 27, 2001 (2 pages).
Monitor Technologies website pages on *Rotary Paddle Bin Monitor* dated Apr. 27, 2001 (6 pages).
Monitor Technologies brochure Bulletin 213 on *Rotary Paddle Bin Monitor* (6 pages undated).

* cited by examiner

*Primary Examiner*—Van Trieu
(74) *Attorney, Agent, or Firm*—Leydig, Voit & Mayer, Ltd

(57) ABSTRACT

A rotary paddle bin monitor for indicating a level of dry bulk material in a bin. In normal operation, a rotary motor rotates a shaft and paddle. A spring mechanism keeps the motor in a first angular position when the paddle is rotating freely. However, when the paddle engages the dry bulk material, the created torque overcomes the spring mechanism and causes the rotary motor to rotate. A first magnetic detector (e.g. a hall effect detector) mounted inside the housing senses a first magnet marker fixed to the rotary motor via the motor support plate to provide an indication when the rotary motor has rotated due to the sufficient presence of dry bulk material. A second magnetic detector mounted inside the housing senses a second magnet marker fixed to the shaft to provide an indication that the shaft is rotating at a proper speed (and indicate the direction of the rotation as well).

20 Claims, 3 Drawing Sheets

ROTARY PADDLE BIN MONITOR

FIELD OF THE INVENTION

The present invention relates generally to monitors, and more particularly relates to level monitors for determining the levels of materials in such things as bins.

BACKGROUND OF THE INVENTION

Rotary paddle bin monitors are used to monitor the level of dry bulk materials at various single points in storage bins, hoppers, tanks, silos or other structures. Monitor units can be installed almost anywhere dry bulk materials are stored and can used in a wide variety of applications, such as the following applications for example: feed, silica sand, rocks, pellets, wood, calcium dust, rubber, metals, regrind materials, coal, peanuts, malt, clays, resin, limestone, grain, foundry materials, sand pre-mix, rawhide, sawdust, and many other applications.

Monitor Technologies, LLC, the assignee of the instant application, manufactures and sells rotary paddle bin monitors, as can be seen for example at www.monitortech.com or *Monitor® Bulletin* 213 available from Monitor Technologies, LLC. As generally disclosed in those document, rotary paddle bin monitors are typically installed through the wall of a vessel, so that the paddle protrudes inside the vessel. A small electric motor drives a paddle which rotates freely in the absence of material. When the paddle is impeded by material, the motor rotates within the housing which triggers two switches. The first switch is a dry electrical contact closure that is available to control a process function or alarm circuit. The second switch cuts the power to the motor, preventing a locked rotor condition, thus extending motor life. This also activates the signaling device which is wired through that same motor switch. When the material level drops, the loaded stretched tension spring returns the motor to its original running position and the unit is reactivated.

While rotary paddle bin monitors such as those sold by Monitor Technologies, LLC have met with substantial commercial success, there is always a desire to improve reliability in the field or otherwise improve upon the existing technology. One area in long need of improvement has been obtaining accurate feedback about the operation of the monitor. Mechanical feedback devices such as cam lobs and contact switches are prone to wear and can influence the primary torque threshold by providing resistance that can change over time. Optical sensors have been attempted but are subject to the accumulation of dust on the lenses and related equipment. Dust can be especially problematic in dry bulk powders such as at grain elevators. Sealing the monitor housing is only effective up to a point and has not effectively eliminated the dust sufficiently for optical devices.

BRIEF SUMMARY OF THE INVENTION

The present invention is directed toward the use of hall effect detectors or other magnetic sensors on rotary paddle bin monitors to provide reliable feedback about operating conditions of the monitor. The monitor may be subjected to a high dust environment in which the hall effect detectors have been found to reliably work. The hall effect detector can be used to provide feedback to indicate the relative angular position of the motor relative to the housing, and/or also the position, speed and/or direction of the rotating shaft.

The disclosed embodiment of the present invention is a bin monitor adapted to sense a level of dry bulk material in a bin or structure. The monitor comprises a housing, a shaft journalled by bearings for rotation about an axis, a paddle mounted to the shaft on the outside of the housing for engaging dry bulk material, and a rotary motor rotatable inside the housing for rotation relative to the housing. In normal operation, the rotary motor drives the shaft and thus rotates the paddle. A spring mechanism keeps the motor in a first angular position inside the housing when the paddle is rotating freely without engaging dry bulk material. However, when the paddle engages a sufficient amount of the material to create a torque that overcomes the action of the spring mechanism, the rotary motor rotates from the first angular position to a second angular position. The feedback mechanism includes a first magnetic detector mounted inside the housing and a first magnet marker fixed to the rotary motor in sensory communication with the first magnetic detector. The first magnetic detector provides an indication when the rotary motor has rotated due to the sufficient presence of bulk material. The feedback mechanism also includes second magnetic detector mounted inside the housing and a second magnet marker fixed to the shaft in sensory communication with the second magnetic detector. The second magnetic detector provides an indication that the shaft is rotating at a proper speed (and can indicate the direction of the rotation as well).

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
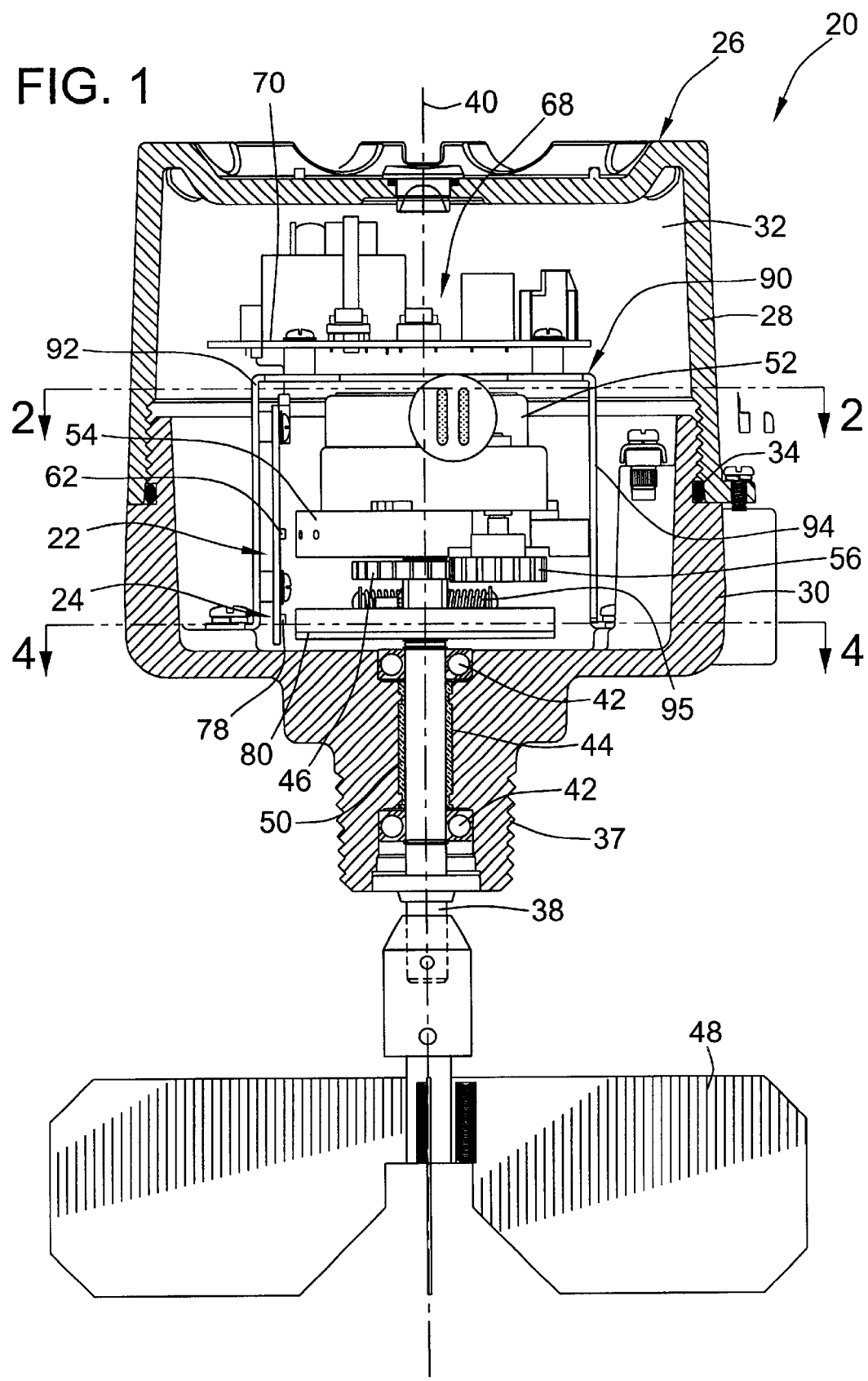
FIG. 1 is a cross section of a rotary paddle bin monitor according to a preferred embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

For purposes of illustration, a preferred embodiment of the present invention has been depicted as a rotary paddle bin monitor 20 incorporating two spaced apart magnetic sensing devices generally indicated at 22, 24 for providing feedback. The monitor 20 includes an outer housing 26 built from a pair of housing shells 28, 30. The shells 28, 30 define an internal chamber 32 that is preferably sealed with a seal 34 therebetween. The housing 26 can be mounted to a variety of structures such as a bin, a tank, a hopper or other similar structure used to hold bulk materials. The housing 26 includes conduit entries 36, a mounting stem 37, a mounting plate (not shown) or other mount structure to provide for mounting of the monitor 20 to such a material holding structure.

The housing 26 carries a shaft 38 for rotation about an axis 40. The shaft 40 is journalled to the housing by bearings such as ball bearing sets 42 or a low friction bearing surface as an alternative. The shaft 40 extends through a formed bore 44 in the housing 26 to include a gear 46 inside the housing 26 at one end, and a paddle 48 at the other end outside of the housing 26. A packing material or seal 58 may be used around the bore 44 to seal the internal chamber 32 from outside contaminants.

Figure 2:
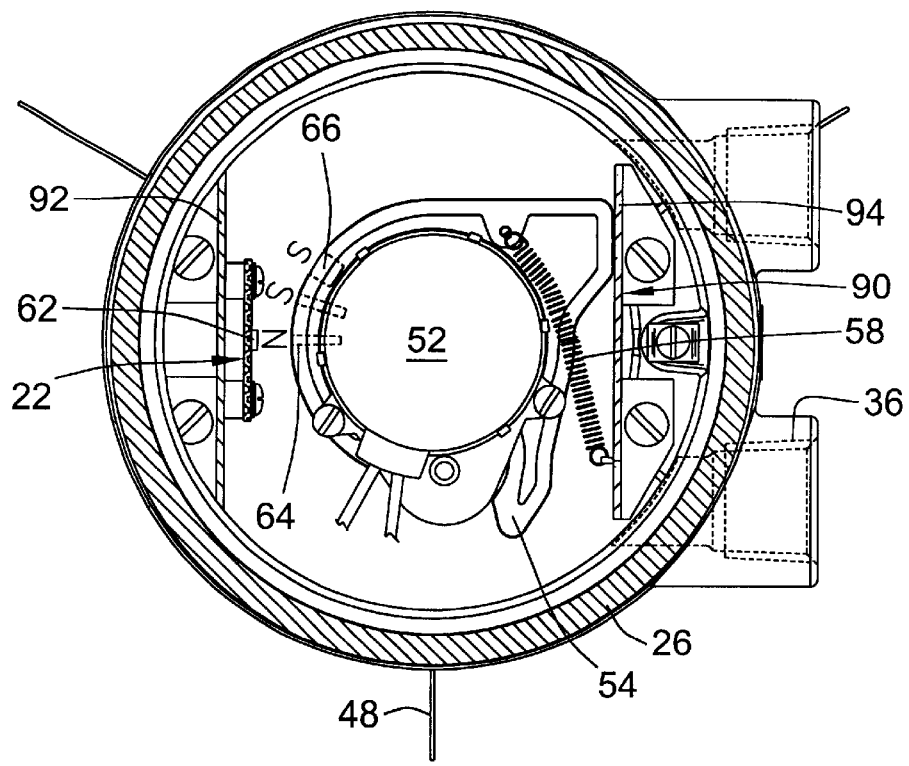
FIGS. 2 and 3 are a cross sections of the rotary paddle bin monitor of FIG. 1 taken about line 2—2, with different angular positions for the rotary motor being illustrated.
Figure 3:
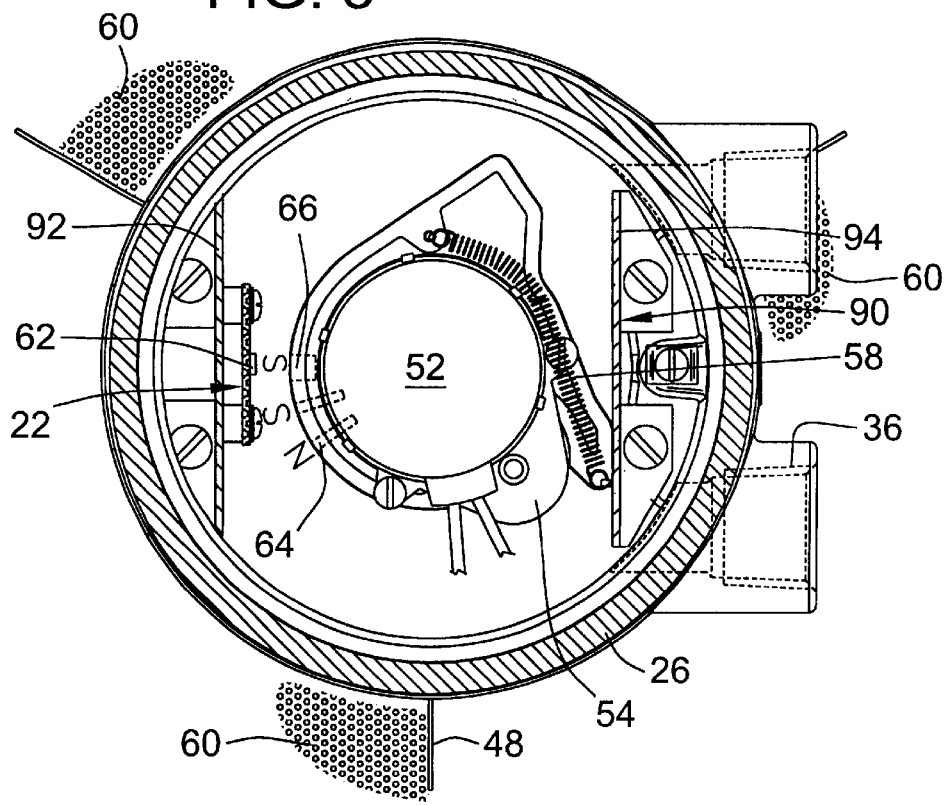

An electrical rotary motor 52 is secured to a support plate 54 that in turn is rotatably mounted inside the housing 26 such that the motor 52 can rotate relative to the housing (e.g. compare FIGS. 2 and 3). The support plate 54 can be mounted on to the end of the shaft 38 with bearings (not shown) therebetween to allow for relative rotation between the motor 52 and shaft 38. The motor 52 has an output gear 56 acting upon the input gear 46 to drive the shaft 38 about its rotational axis 40. A spring 58 fixed to the motor 52 (through plate 54) biases the motor 52 against a mechanical stop to a first angular position as illustrated in FIG. 2.

In operation, when the paddle 48 is rotating freely without engaging any material, the spring 58 applies a torque to the motor 52 maintaining the motor 52 in the first angular position shown in FIG. 2. However, when sufficient material 60 engages the paddle 48, the motor 52 begins to rotate towards a second angular position as shown in FIG. 3. In particular, rotational resistance imparted by the material 60 against the paddle 48 creates a counteracting torque against the bias torque provided by the spring 58 that eventually lifts the motor from the mechanical stop. The force of the spring 58 determines how much material 60 the point at which the motor 52 starts to rotate but is typically more than a point where very little material is engaging the paddle 48 but less than a point where the paddle is fully engulfed in material.

In accordance with the present invention, the monitor 20 includes the first and second magnetic sensing devices 22, 24 for providing accurate and reliable feedback. The first magnetic sensing device 22 includes a hall effect detector 62 and a magnetic marker affixed to the outer periphery of the support plate 54 and is therefore fixed relative to the motor 52. In the disclosed embodiment, the magnetic marker comprises adjacent north and south pole sections 64, 66. The north and south pole sections 64, 66 are angularly spaced relative to the axis 40 such that only one of the magnetic sections 64, 66 is in front of the face of the hall effect detector 62 at any time.

An electronic controller 68 is responsive to the output of the first hall effect detector 62. The electronic controller 68 is illustrated as internal to the housing 26 being part of control board 70 but could also be external if protected. When the rotary motor 52 is in the first angular position shown in FIG. 2 in which the motor 52 is on with the paddle 48 rotating freely, the north pole section 64 is facing and therefore is sensed by the hall effect detector 62. The hall effect detector 62 has an electrical output to the electronic controller 68 indicating the absence of material based on this condition. However, when the motor 52 rotates to the second angular position shown in FIG. 3 in which the south pole section 66 is facing and is therefore sensed by the hall effect detector 62, the hall effect detector 62 outputs a different signal indicating the presence of material 60 imparting resistance on the paddle 48. In response to the material sensed signal, the electronic controller 68 also outputs a shut off signal to the motor 52 shutting the motor 52 off. Motor shut off must occur, otherwise motor torque would cause the clutch 95 to slip and the paddle would continue to be rotated within the material or would cause a locked motor condition and potential motor failure. The clutch 95 is included to provide protection against impacts to the paddle being directly passed to the internal motor gears. The motor stays in this second angular position and in the off state illustrated in FIG. 3 until the material 60 retreats. When material 60 retreats, less resistance is imparted on the paddle 48. This allows the mechanical action of the spring 58 to move the motor 52 back towards the first angular position of FIG. 2. As a result, the magnetic field in front of the hall effect detector 62 also changes back with the north pole section 64 being sensed by the hall effect detector 62. This in turn causes the hall effect detector 62 to output a signal indicating the retreating of material. In response, the electronic controller 68 again turns the motor 52 on until the level of material rises again.

Figure 4:
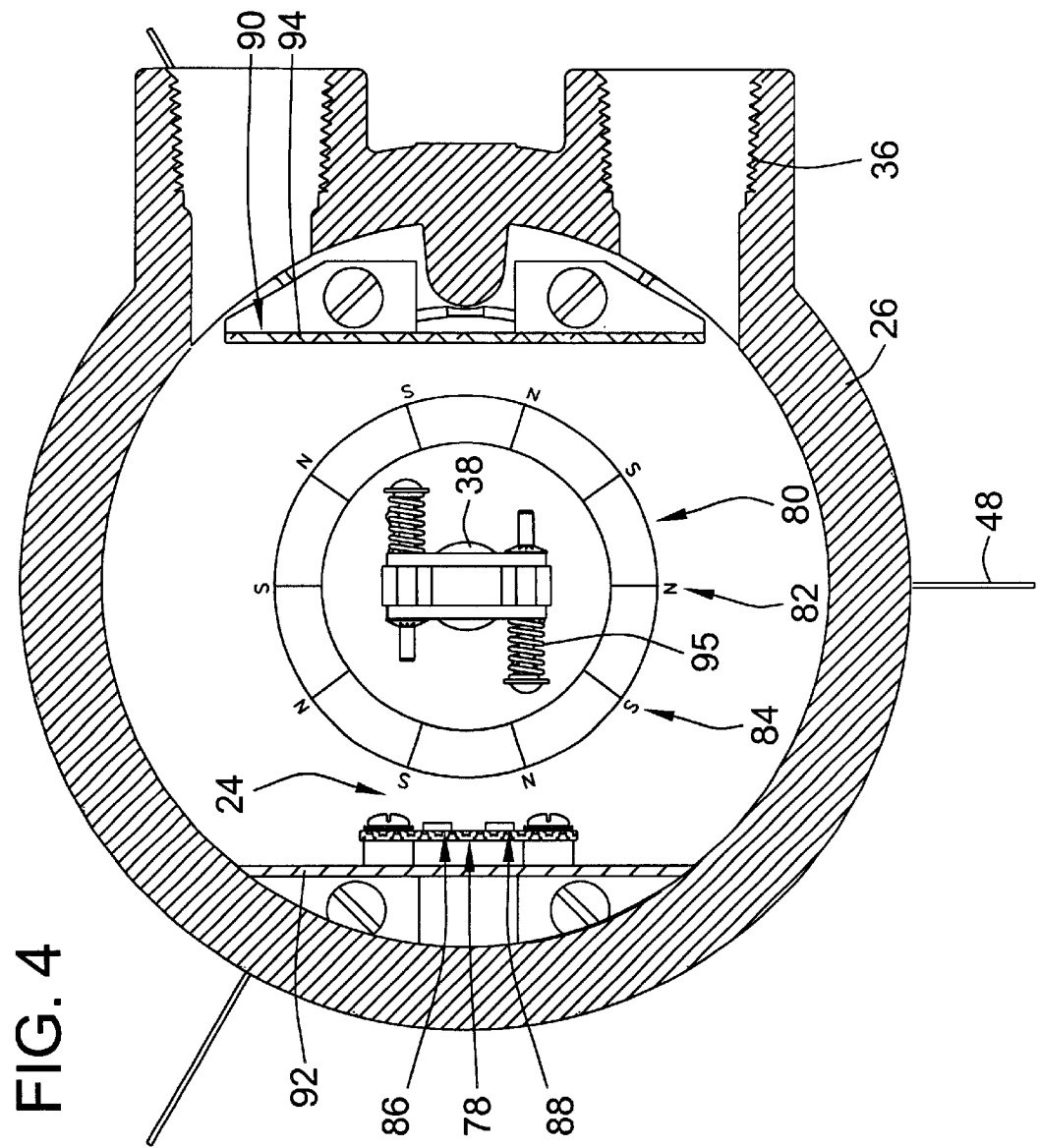
FIG. 4 is a cross section of the rotary paddle bin monitor of FIG. 1 taken about line 4—4.

Turning to FIGS. 1 and 4, the second magnetic sensing device 22 includes a second hall effect detector 78 and a magnetic marker affixed to the shaft 38 in the form of a magnetic ring 80, all in the same plane. The magnetic ring 80 comprises a plurality of alternating north and south pole segments 82, 84 coaxial arranged about the axis 40. The electronic controller 68 is also responsive to the second hall effect detector 78. When the shaft 38 and magnetic ring 80 rotate in unison, the rotation of the magnetic ring 80 creates an alternating magnetic field at the second hall effect detector 78. As such, the second hall effect detector 78 generates an alternating electrical signal in response to the alternating magnetic field. In response, the electronic controller 68 determines a rotary speed of the shaft 38 based on the alternating electrical signal by counting the switches in magnetic field (eg. in this case, 10 switches equals on rotation due to 10 north and south pole segments 82, 84). The electronic controller 68 compares the rotary speed against a predetermined range that has been determined to be normal operating conditions for the rotary motor 52. If the determined or sensed rotary speed is outside of the normal predetermined range, the electronic controller 68 outputs a fault signal that may be used to sound an alarm, shut down a system or motor, or other suitable purpose.

As shown in FIG. 4, the second hall effect detector 78 also comprises first and second sensing portions 86, 88 that are spaced relative to the angular spacing of the north and south pole sections 82, 84. The first and second sensing portion 86, 88 generate first and second alternating electrical signals in response to the alternating magnetic field that are offset in phase. More specifically, when subjected to an alternating magnetic field, hall effect detectors 78 generate an electrical signal. With the first and second sensing portion 86, 88 offset angularly, the phase of the electrical signal between these sensing portions 86, 88 is also offset (e.g. by 90 degrees). Based on the offset in phase, the electronic controller 68 determines a rotational direction of the shaft 68 by which phase is leading the other phase. The electronic controller 68 also outputs a fault signal when the rotational direction is different from a predetermined rotational direction.

To arrange the separate sensing devices 22, 24 in non interfering locations, the monitor also includes a retainer 90 secured to the housing 26 in the internal chamber 32. The retainer 90 at least partially surrounds the motor 52 in spaced relation thereto so as to avoid interference with the rotation of the motor 52. The retainer 90 supports the first and second hall effect detectors 62, 78 in axial spaced relation relative to each other. The retainer 90 also supports the hall effect detectors 62, 78 in proper radial spaced relation to their respective magnetic markers. In the disclosed embodiment, the retainer 90 comprises first and second legs 92, 94 fastened to the housing 26 on opposite sides of the motor 52 for proper support. The retainer 90 includes a mounting surface 96 extending radially over the terminating end of the motor 52 and generally perpendicular through the axis 40. The retainer 90 supports the electronics control board 70 (that communicates with the first and second magnetic sensors 22, 24) on the mounting surface 96.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A monitor adapted to sense a level of a material in a structure, comprising:
   a housing adapted to be mounted to the structure;
   a bearing supported by the housing;
   a shaft journalled by the bearing for rotation about an axis;
   a paddle mounted to the shaft outside of the housing adapted to engage the material in the structure;
   a rotary motor rotatable inside the housing for rotation relative to the housing, the rotary motor having on and off states, the rotary motor rotating the shaft about the axis when in the on state;
   a spring mechanism supported by the housing and acting on the rotary motor to keep the motor in a first angular position inside the housing when the paddle is rotating freely without engaging material, the rotary motor rotating from the first angular position to a second angular position when the paddle engages a sufficient amount of the material to create a torque that overcomes the action of the spring mechanism thereby allowing rotation of the rotary motor;
   a first magnetic detector mounted inside the housing;
   a first magnet marker fixed to the rotary motor in sensory communication with the first magnetic detector in one of the first and second angular position, the first magnetic detector providing an indication when the rotary motor is in the second angular position;
   a second magnetic detector mounted inside the housing; and
   a second magnet marker fixed to the shaft in sensory communication with the second magnetic detector, the second magnetic detector providing an indication that the shaft is rotating in response to rotation of the second magnet marker relative to the second magnetic detector.

2. The monitor of claim 1 further comprising an electronic controller responsive to the first magnetic detector, the first magnetic detector outputting a material sensed signal when the rotary motor is in the second angular position.

3. The monitor of claim 2 wherein the electronic controller switches the rotary motor to the off state when the first magnetic detector provides the indication that the rotary motor is in the second angular position.

4. The monitor of claim 3 wherein the electronic controller switches the rotary motor to the on state when the first magnetic detector indicates that the rotary motor is no longer in the second angular position but has rotated back toward the first angular position.

5. The monitor of claim 4 wherein the first magnet marker comprises adjacent north and south pole sections, the sections being angularly spaced relative to the axis.

6. The monitor of claim 1 further comprising an electronic controller responsive to the second magnetic detector, wherein rotation of the second magnetic marker creates an alternating magnetic field at the second magnetic detector, the second magnetic detector generating an alternating electrical signal in response to the alternating magnetic field, the electronic controller determining a rotary speed of the shaft based on the alternating electrical signal and comparing the rotary speed against a normal predetermined range, the electronic controller outputting a fault signal when the rotary speed is outside of the normal predetermined range.

7. The monitor of claim 6, wherein the second magnet marker is a ring magnet comprising a plurality of alternating north and south pole segments coaxial arranged about the axis.

8. The monitor of claim 7 wherein the second magnetic detector comprises first and second sensing portions, the first and second sensing portions generating first and second alternating electrical signal in response to the alternating magnetic field, the first and second sensing portions arranged in spaced angular locations relative to the axis such that the first and second alternating electrical signals are offset in phase wherein the electronic controller determines a rotational direction of the shaft, the electronic controller outputting a fault signal when the rotational direction is different from a predetermined rotational direction.

9. The monitor of claim 1 further comprising a retainer secured to the housing inside of the housing at least partially surrounding the motor, the retainer supporting the first and second magnetic detectors in axial spaced relation and in radially spaced relation to the first and second magnetic markers, respectively.

10. The monitor of claim 9 wherein the retainer comprises first and second legs fastened to the housing in spaced angular positions about the motor, the retainer including a mounting surface extending radially over an end of the motor and generally perpendicular through the axis in spaced axial relation to the motor, an electronics board communicating with the first and second magnetic detectors being secured to the mounting surface.

11. A monitor adapted to sense a level of material in a structure, comprising:
    a housing adapted to be mounted to the structure;
    a bearings supported by the housing;
    a shaft journalled by the bearings for rotation about an axis;
    a paddle mounted to the shaft outside of the housing;
    a motor inside the housing, the motor acting on the shaft to rotate the shaft about the axis; and
    a magnetic sensing device inside the housing comprising a magnetic detector and a magnet marker, one of the magnetic detector and the magnet marker being fixed to one of the shaft and the motor, the magnet marker adapted to rotate relative to the magnetic detector between first and second angular positions, the magnetic detector sensing the magnet marker to indicate an angular position of said one of the shaft and the rotary motor.

12. The monitor of claim 11 wherein the magnetic sensing device is arranged between the housing and the motor for indicating angular position of the motor, the motor adapted to rotate relative to the housing between first and second angular positions.

13. The monitor of claim 12 further comprising an electronic controller responsive to the magnetic detector, the magnetic detector outputting a material sensed signal when the motor is in the second angular position.

14. The monitor of claim 13 wherein the electronic controller switches the motor to the off state when the magnetic detector provides the indication that the motor is in the second angular position.

15. The monitor of claim 14 wherein the electronic controller switches the motor to the on state when the magnetic detector indicates that the motor is no longer in the second angular position but has rotated back toward the first angular position.

16. The monitor of claim 15 wherein the magnet marker comprises adjacent north and south pole sections, the sections being angularly spaced relative to the axis.

17. The monitor of claim 11 wherein the magnetic detector is fixed to the housing and the magnetic marker is fixed to the shaft such that the magnetic sensing device indicates angular position of the shaft.

18. The monitor of claim 17 further comprising an electronic controller responsive to the magnetic detector, wherein rotation of the magnetic marker creates an alternating magnetic field at the magnetic detector, the magnetic detector generating an alternating electrical signal in response to the alternating magnetic field, the electronic controller determining a rotary speed of the shaft based on the alternating electrical signal and comparing the rotary speed against a normal predetermined range, the electronic controller outputting a fault signal when the rotary speed is outside of the normal predetermined range.

19. The monitor of claim 18, wherein the magnet marker is a ring magnet comprising a plurality of alternating north and south pole segments coaxial arranged about the axis.

20. The monitor of claim 19 wherein the magnetic detector comprises first and second sensing portions, the first and second sensing portions generating first and second alternating electrical signal in response to the alternating magnetic field, the first and second sensing portions arranged in spaced angular locations relative to the axis such that the first and second alternating electrical signals are offset in phase wherein the electronic controller determines a rotational direction of the shaft, the electronic controller outputting a fault signal when the rotational direction is different from a predetermined rotational direction.

* * * * *